US009363756B2

(12) United States Patent
Soma et al.

(10) Patent No.: US 9,363,756 B2
(45) Date of Patent: Jun. 7, 2016

(54) ELECTRIC-POWER SUPPLYING APPARATUS, METHOD, AND PROGRAM

(75) Inventors: Isao Soma, Saitama (JP); Kazuyoshi Takemura, Tokyo (JP); Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 13/604,863

(22) Filed: Sep. 6, 2012

(65) Prior Publication Data

US 2013/0065552 A1    Mar. 14, 2013

(30) Foreign Application Priority Data

Sep. 13, 2011 (JP) ................................. 2011-199420

(51) Int. Cl.
*H04W 52/02* (2009.01)
*H04W 52/08* (2009.01)

(52) U.S. Cl.
CPC .......... *H04W 52/0261* (2013.01); *H04W 52/08* (2013.01)

(58) Field of Classification Search
CPC .......... H04B 3/54; H04B 3/542; H04B 3/544; H04B 2203/54; H04B 2203/5404; H04B 2203/5429; H04B 2203/5462; H04L 2012/28; H04L 2012/2843; H04L 41/0803; H04W 12/00; H04W 12/04; H04W 12/06; H04W 12/08; H04W 84/12
USPC .......... 455/418–420, 406; 370/252, 328, 338; 709/217–218, 220–228, 249
See application file for complete search history.

(56) References Cited

U.S. PATENT DOCUMENTS

| | | | |
|---|---|---|---|
| 7,501,913 B2 | 3/2009 | Hanada et al. | |
| 8,036,233 B2 | 10/2011 | Yokomitsu et al. | |
| 8,519,560 B2 | 8/2013 | Ito | |
| 2003/0043027 A1* | 3/2003 | Carson et al. | 340/310.01 |
| 2004/0082203 A1 | 4/2004 | Logvinov et al. | |
| 2004/0223275 A1 | 11/2004 | Yanagida et al. | |
| 2004/0258031 A1* | 12/2004 | Zabawskyj et al. | 370/338 |
| 2005/0063355 A1 | 3/2005 | Iwamura | |
| 2006/0046693 A1* | 3/2006 | Tran et al. | 455/411 |
| 2006/0132299 A1 | 6/2006 | Mansfield et al. | |
| 2007/0091925 A1 | 4/2007 | Miyazaki et al. | |
| 2007/0120953 A1 | 5/2007 | Koga et al. | |

(Continued)

FOREIGN PATENT DOCUMENTS

| | | |
|---|---|---|
| JP | 3-119298 | 12/1991 |
| JP | 11-288315 A | 10/1999 |

(Continued)

*Primary Examiner* — Michael Mapa
(74) *Attorney, Agent, or Firm* — Chip Law Group

(57) ABSTRACT

An electric-power supplying apparatus may include a power supply configured to supply electric power to an electric device via a power supply line, and at least one processor programmed to perform acts including transmitting a command signal to the electric device via the power supply line, receiving a response signal from the electric device via load modulation on the power supply line, and registering setting information for establishing wireless communication between the electric device and the apparatus based on the received response signal. An electric apparatus may include a power plug configured to receive electric power and a command signal from an external device, and an IC chip configured to use load modulation to transmit a response signal, in response to the command signal, to the external device via the power plug.

21 Claims, 6 Drawing Sheets

(56) References Cited

U.S. PATENT DOCUMENTS

| | | |
|---|---|---|
| 2007/0149258 A1 | 6/2007 | Tokunaga |
| 2007/0223381 A1* | 9/2007 | Radtke .......................... 370/236 |
| 2007/0271398 A1* | 11/2007 | Manchester et al. .......... 709/249 |
| 2008/0107134 A1 | 5/2008 | Okazaki et al. |
| 2008/0129468 A1* | 6/2008 | Matsuoka ........... H02J 13/0024 375/259 |
| 2008/0295091 A1* | 11/2008 | Shintani .................. H04B 3/54 717/172 |
| 2009/0199281 A1* | 8/2009 | Cai et al. ............................ 726/7 |
| 2010/0026087 A1 | 2/2010 | Morita et al. |
| 2010/0027599 A1 | 2/2010 | Di Chiro et al. |
| 2010/0118983 A1* | 5/2010 | Weber .................... H04B 3/548 375/257 |
| 2010/0194529 A1 | 8/2010 | Yamamoto |
| 2010/0315197 A1 | 12/2010 | Solomon et al. |
| 2011/0043163 A1* | 2/2011 | Baarman ....................... 320/108 |
| 2011/0133552 A1 | 6/2011 | Binder et al. |
| 2011/0286534 A1 | 11/2011 | Hatakeyama |
| 2011/0309916 A1 | 12/2011 | Mueller et al. |
| 2011/0317603 A1* | 12/2011 | Ruiz Lopez et al. .......... 370/311 |
| 2012/0092141 A1 | 4/2012 | Ichihara et al. |
| 2012/0217928 A1 | 8/2012 | Kulidjian et al. |
| 2012/0268973 A1 | 10/2012 | Tsai et al. |
| 2012/0300860 A1 | 11/2012 | Washiro |
| 2013/0003876 A1* | 1/2013 | Bennett ................. H04W 36/14 375/257 |
| 2013/0007855 A1* | 1/2013 | Bennett .................... H04B 3/54 726/5 |
| 2013/0063255 A1 | 3/2013 | Washiro |

FOREIGN PATENT DOCUMENTS

| | | |
|---|---|---|
| JP | 3289320 B2 | 6/2002 |
| JP | 2003-078458 A | 3/2003 |
| JP | 2003-110471 A | 4/2003 |
| JP | 2006-072815 A | 3/2006 |
| JP | 2008-306840 A | 12/2008 |
| JP | 2010-055845 A | 3/2010 |

* cited by examiner

ELECTRIC-POWER SUPPLYING APPARATUS, METHOD, AND PROGRAM

BACKGROUND

The present technology relates to an electric-power supplying apparatus, method, and program and, in particular, relates to an electric-power supplying apparatus that supplies electric-power to an electric device having a communication function via an electric-power supply line and supplies setting information to the electric device for establishing communication with the electric-power supplying apparatus via the electric-power supply line while supplying electric power to the electric device, if the electric device does not have the setting information for establishing the communication with the electric-power supplying apparatus. The present technology also relates to the electric-power supplying method and program.

In recent years, restaurants and many other locations serve as wireless local-area-network (LAN) spots where free wireless LAN service for portable terminals and portable personal computers are available.

Such a free wireless LAN service is usually provided to customers of, for example, a restaurant. A customer at the restaurant receives setting information for using the wireless LAN service at the restaurant and inputs the setting information to a portable terminal or personal computer so as to use the wireless LAN. To simplify the operation of input of such setting information, a technology conforming to the guideline of Digital Living Network Alliance (DLNA) is proposed for searching for and registering devices connected to a network (refer to Japanese Unexamined Patent Application Publication No. 2006-72815).

SUMMARY

Even when the DLNA guideline is used, the user is requested to input various pieces of setting information, such as an Internet protocol (IP) address and a default gateway. Since the keyboard of, for example, a portable terminal is small and difficult to handle, inputting setting information in such a portable terminal is troublesome.

The present technology has been conceived in light of such circumstances and establishes wireless communication by registering setting information, while electric power is supplied via an electric-power supply line to an electric device having a wireless communication function, to the electric device via the electric-power supply line without a troublesome operation of input of the setting information when the setting information for establishing the wireless communication has not been registered in the electric device.

An electric-power supplying apparatus according to an embodiment of the present technology includes an electric-power supplying unit configured to supply electric power to a device having a wireless communication function via an electric-power supply line; and a reader/writer unit configured to read out setting information that is used for performing the wireless communication function of the device from a storage unit of the device via the electric-power supply line by load modulation using a high-frequency signal.

The electric-power supplying apparatus may further include a control unit configured to control the reader/writer unit to write the setting information in the storage unit of the device.

The electric-power supplying apparatus may further include a control unit configured to control the reader/writer unit to write setting information valid for establishing wireless communication with the electric-power supplying apparatus in the storage unit of the device when the setting information read out by the reader/writer unit is invalid for establishing wireless communication with the electric-power supplying apparatus.

The electric-power supplying apparatus may further include a setting determining unit configured to determine whether the setting information that is used for performing the wireless communication function of the device read out from the storage unit of the device by the reader/writer unit is setting information valid for wireless communication with the electric-power supplying apparatus.

The electric-power supplying apparatus may further include a billing management unit configured to determine whether a user of the device is capable of being billed a fee for establishing wireless communication with the electric-power supplying apparatus on the basis of the presence of billing information for the fee for establishing wireless communication with the electric-power supplying apparatus.

When the setting determining unit determines that the setting information read out by the reader/writer unit is not valid for establishing wireless communication with the electric-power supplying apparatus and when the billing management unit determines that billing of the fee for establishing wireless communication with the electric-power supplying apparatus is possible, the control unit may control the reader/writer unit to write setting information valid for establishing wireless communication with the electric-power supplying apparatus in the storage unit of the device.

The setting information may include an SSID, a WEP key, a passcode, or a user ID for wireless LAN or Bluetooth.

A method of supplying electric power according to an embodiment of the present technology carried out by an electric-power supplying apparatus may include supplying electric power to a device having a wireless communication function via an electric-power supply line; and reading setting information that is used for performing the wireless communication function of the device via the electric-power supply line by load modulation using a high-frequency signal.

A program according to an embodiment of the present technology causes a computer to function as an electric-power supplying unit configured to supply electric power to a device having a wireless communication function via an electric-power supply line; and a reader/writer unit configured to read setting information that is used for performing the wireless communication function of the device via the electric-power supply line by load modulation using a high-frequency signal.

According to an embodiment of the present technology, electric power is supplied to a device having a wireless communication function via an electric-power supply line and setting information that is used for performing the wireless communication function of the device is read out from a storage unit of the device via the electric-power supply line by load modulation using a high-frequency signal.

The electric-power supplying apparatus according to the present technology may be an individual apparatus or may be a block carrying out an electric-power supplying process.

According to the present technology, input of setting information associated with communication via a network by a user is omitted, and communication with only users registered for use of the network can be easily provided.

Accordingly, one type of embodiment is directed to apparatus comprising a power supply configured to supply electric power to an electric device via a power supply line, and at least one processor programmed to perform acts comprising: transmitting a command signal to the electric device via the power supply line; receiving a response signal from the electric device via load modulation on the power supply line; and registering setting information for establishing wireless communication between the electric device and the apparatus based on the received response signal.

Another type of embodiment is directed to apparatus comprising: a power plug configured to receive electric power and a command signal from an external device; and an IC chip configured to use load modulation to transmit a response signal, in response to the command signal, to the external device via the power plug.

Another type of embodiment is directed to a method comprising: supplying electric power to an electric device via a power supply line; transmitting a command signal to the electric device via the power supply line; receiving a response signal from the electric device via load modulation on the power supply line; and registering setting information for establishing wireless communication with the electric device based on the received response signal.

DETAILED DESCRIPTION OF EMBODIMENTS

Embodiments of the present technology will be described below. The embodiments will be described in the following order:

1. first embodiment (electric-power supplying system that does not processes billing associated with wireless communication); and 2. second embodiment (electric-power supplying system that processes billing associated with wireless communication).

Figure 1:
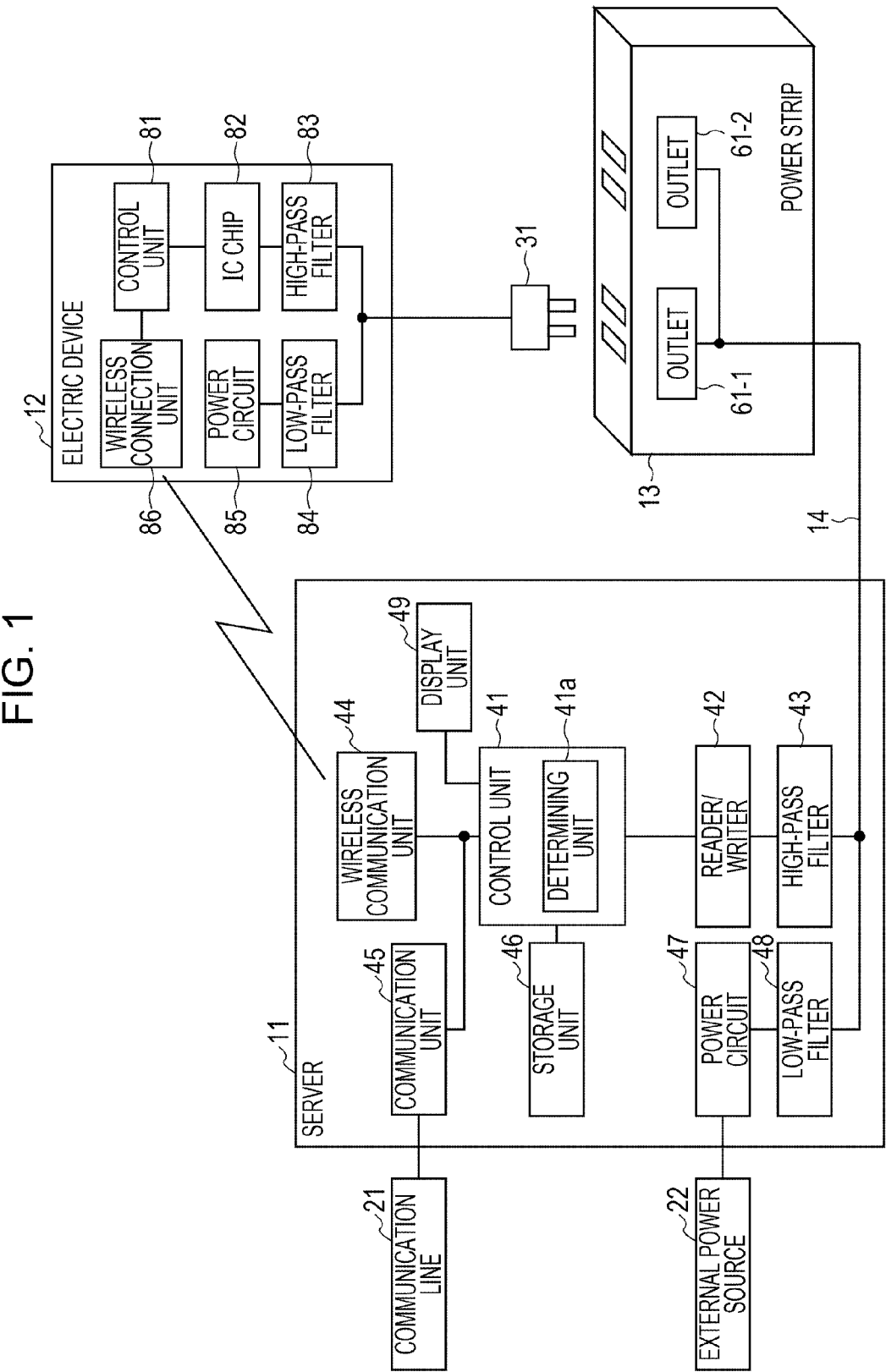
FIG. 1 is a block diagram of an example configuration of an electric-power supplying system according to a first embodiment of the present technology.

First Embodiment
Electric-Power Supplying System that does not Processes Billing Associated with Wireless Communication FIG. 1 illustrates an example configuration of the hardware of an electric-power supplying system according to the first embodiment to which an electric-power supplying apparatus according to the present technology is applied. The electric-power supplying system in FIG. 1 includes a server 11, an electric device 12, and a power strip 13. The server 11 functions as an electric-power supplying apparatus by supplying electric power from the power strip 13 to the electric device 12 and functions as a wireless local-area-network (LAN) router by communicating with the electric device 12 through a wireless LAN. The electric device 12 receives electric power from the power strip 13, communicates with the server 11 via the wireless LAN, and connects to a network, which is typically the Internet, via a communication line 21 connected to the server 11.

The server 11 of the electric-power supplying system is installed in, for example, a restaurant or a coffee shop and functions as a wireless LAN router to establish a wireless LAN spot where wireless LAN service is provided. That is, a user visiting the restaurant or coffee shop connects a power plug 31 of his/her electric device 12, which is a portable terminal or portable personal computer, to the power strip 13 to receive electric power. Then, the user can use a network connection service for connecting to, for example, the Internet by starting up the electric device 12 and establishing communication with the server 11 via the wireless LAN.

The server 11 includes a control unit 41, a reader/writer 42, a high-pass filter 43, a wireless communication unit 44, a communication unit 45, a storage unit 46, a power circuit 47, a low-pass filter 48, and a display unit 49.

The control unit 41 includes at least one processor such as a microcomputer and comprehensively controls the operation of the server 11. The control unit 41 controls the reader/writer 42 to read/write setting information associated with wireless LAN communication from/to an IC chip 82 of the electric device 12, whose power plug 31 is connected to an outlet 61-1 or 61-2 of the power strip 13. The control unit 41 also includes a determining unit 41a, which determines whether the setting information associated with the wireless LAN communication stored on the IC chip 82 of the electric device 12 and read out by the reader/writer 42 is valid for establishing wireless communication with the wireless communication unit 44 of the server 11. If the setting information associated with the wireless LAN communication stored on the IC chip 82 of the electric device 12 is not valid for wireless communication with the wireless communication unit 44, the control unit 41 controls the reader/writer 42 to rewrite the information on the IC chip 82, causing electric device 12 to store different setting information that is valid for wireless communication with the server 11. When the wireless communication unit 44 communicates using a wireless LAN, the setting information includes information such as an Internet protocol (IP) address, a default gateway, a wired equivalent privacy (WEP) key, a service set identifier (SSID), and a user ID. If the wireless communication unit 44 communicates using Bluetooth, the setting information includes an SSID and a passcode.

The reader/writer 42 is controlled by the control unit 41 and may transmit a command signal (e.g., a high-frequency reading/writing instruction signal of, for example, 13.56 MHz or 2.4 GHz) to the IC chip 82 of electric device 12 upon reception of an instruction from the control unit 41 to read/write information from/to the IC chip 82 of the electric device 12. The instruction signal is superimposed on a signal in an electric-power supply line 14 as a high-frequency signal via the high-pass filter 43 and is sent to the electric device 12 via the power plug 31, which is connected to the outlet 61-1 or 61-2 of the power strip 13 and may be configured to receive both the electric power and the command signal together from an external device such as server 11 (e.g., via power strip 13). At the electric device 12, a high-pass filter 83 may block the electric power frequency and pass the instruction signal to the IC chip 82 from the power plug 31. The IC chip 82 reads/writes information by load modulation using the high-frequency signal. In some embodiments, the command signal may also be transmitted via load modulation on the power supply line, although this is not required. The IC chip 82 is, for example, Felica®, MIFARE®, or RFID®. The IC chip 82 receives operating power based on the high-frequency instruction signal. Further, the device ID and setting information stored on the IC chip 82 is read out, or setting information corresponding to a writing instruction is written in the IC chip 82 based on the high-frequency instruction signal. In such a case, in the electric device 12, the high-frequency instruction signal is blocked by a low-pass filter 84 and is not transmitted to a power circuit 85. In other words, the low-pass filter 84 functions as a blocking filter.

A communication unit 45, which includes an Ethernet card, transmits/receives various types of data and programs through a network, which is typically the Internet, via the external communication line 21 connected to the network. The storage unit 46 is, for example, a hard disk drive (HDD) or a solid state disk (SSD). Various types of data and programs are stored in or read out from the storage unit 46 on the basis of instructions from the control unit 41.

The power circuit 47 outputs electric power supplied from an external power source 22, which is, for example, a 100-V alternating current (AC) source of 50 or 60 Hz, and superimposes the output electric power to the electric-power supply line 14 through the low-pass filter 48. The electric power supplied to the electric-power supply line 14 is further supplied to the electric device 12 via the power plug 31, which is connected to the outlet 61-1 or 61-2 of the power strip 13. In the electric device 12, the low-pass filter 84 receives electric power, which is the source of power for the electric device 12, from the power plug 31 and supplies the received electric power to the power circuit 85. The power strip 13 is disposed in a space of a shop, which is managing the server 11, e.g., restaurant where a customer of the shop can insert the power plug 31 into the outlet 61-1 or 61-2 when the customer uses the electric device 12, which is a portable terminal or a portable personal computer. Thus, it is presumed that the electric device 12, which has the power plug 31 that is to be inserted in the outlet 61-1 or 61-2, is owned and used by a customer of the restaurant. When the outlets 61-1 and 61-2 do not have to be distinguished, they are collectively referred to as "an outlet 61." This is also the same for other configurations.

The display unit 49 includes a liquid crystal display (LCD) or an organic electroluminescent (EL) display and displays various types of information. The display unit 49 has a touch panel that receives various sets of operating information. In response to the received operating information, the display unit 49 generates an operating signal corresponding to the received operating information and supplies the operating signal to the control unit 41. Wireless-LAN use management process carried out by the electric-power supplying system in FIG. 1

Figure 2:
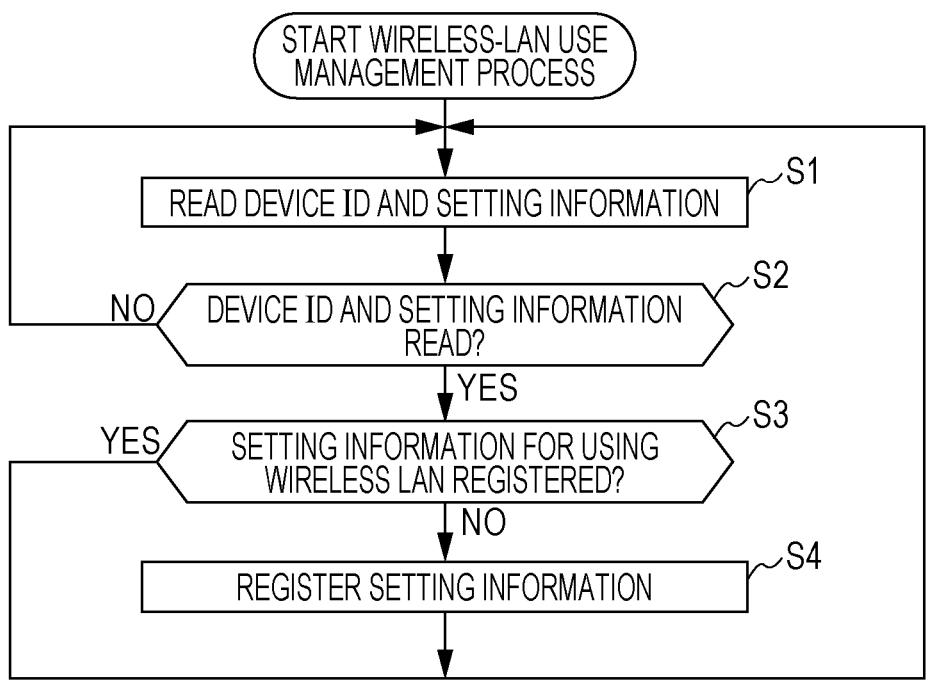
FIG. 2 is a flowchart illustrating a wireless-LAN use management process carried out by the electric-power supplying system in FIG. 1.

A wireless-LAN use management process carried out by the electric-power supplying system illustrated in FIG. 1 will be described below with reference to the flowchart in FIG. 2.

In Step S1, the control unit 41 controls the reader/writer 42 to carry out a communication process for communicating with the electric device 12 so as to check whether the electric device 12 has been connected to an outlet 61 via the power plug 31. By communicating with the electric device 12, the reader/writer 42 reads out the device ID and the setting information from the electric device 12 which is to be used for wireless communication with the wireless communication unit 44.

Communication Process

Figure 3:
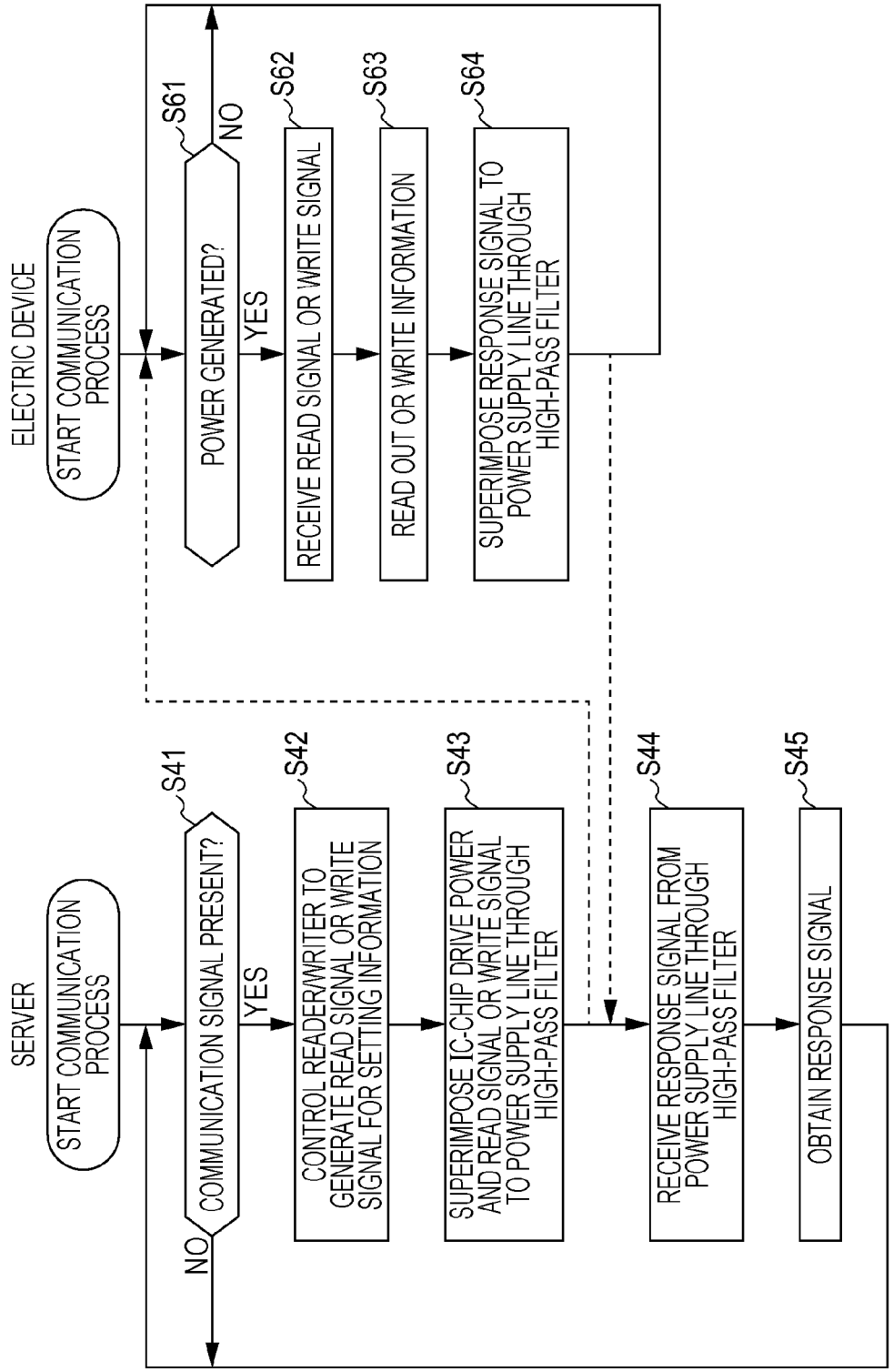
FIG. 3 is a flowchart illustrating a communication process carried out by the electric-power supplying system in FIG. 1.

The communication process carried out between the server 11 and the electric device 12 will be described in detail below with reference to the flowchart in FIG. 3.

In Step S41, the control unit 41 of the server 11 controls the reader/writer 42 to determine whether a communication signal for establishing communication with the electric device 12 has been generated. This process is repeated until a communication signal is detected. That is, in Step S41, it is determined that a communication signal is detected when, for example, as in Step S1 in the flowchart in FIG. 2, the readout of setting information associated with wireless communication that is stored on the IC chip 82 of the electric device 12 is instructed. Then, the process proceeds to Step S42.

In Step S42, the control unit 41 controls the reader/writer 42 to generate a command signal, which may be a high-frequency reading signal for reading certain information (which, in this case, is the device ID and the setting information) or a writing signal for writing certain information (which, in this case, is the setting information) and supply the generated signal to the high-pass filter 43.

In Step 43, the high-pass filter 43 outputs and superimposes the high-frequency signal generated by the reader/writer 42 to the electric-power supply line 14. The high-frequency signal is a reading signal or a writing signal and also provides the driving power of the IC chip 82. Through this step, the high-frequency signal is superimposed to the electric-power supply line 14 and is output to the outlet 61 of the power strip 13.

In Step S61, the high-frequency signal is supplied to the electric device 12 through the power plug 31, which is connected to the outlet 61, and is then supplied to the IC chip 82 through the high-pass filter 83. The IC chip 82 determines whether electric power has been generated by load modulation on the basis of the supplied high-frequency signal. That is, a certain period of time at the head of the high-frequency signal that has been generated by the reader/writer 42 contains a signal for generating the driving power of the IC chip 82, and then a signal corresponding to the command, such as a reading or writing command, follows. Actually, the IC chip 82 does not determine whether electric power has been generated but starts operating when electric power is generated. The electric power generated by the IC chip 82 corresponding to the head portion of the high-frequency signal is stored in IC chip 82. Then, in response to the following reading or writing command in the signal, the IC chip 82 uses the stored electric power to read out certain information (which, in this case, is the device ID and the setting information) stored in a storage unit of the IC chip 82 or write certain information (which, in this case, is setting information) in the storage unit.

In Step S61, for example, if the power plug 31 is connected to the outlet 61 of the power strip 13, electric power is generated in response to the high-frequency signal supplied through the high-pass filter 83 in Step 43. Thus, the process proceeds to Step S62.

In Step S62, the IC chip 82 acquires the reading signal or writing signal supplied along with the high-frequency signal.

In Step S63, the IC chip 82 uses the stored electric power to read out information (which, in this case, is the device ID and the setting information) from the storage unit in response to the reading signal or write information (which, in this case, is the setting information) in the storage unit in response to the writing signal. In Step S1 in FIG. 2, the IC chip 82 reads out the setting information associated with wireless communication, which is stored in the IC chip 82.

In Step S64, in response to a writing signal (e.g., indicating the setting information to be written), the IC chip 82 generates a high-frequency response signal indicating (e.g., confirming) that the writing has been completed (e.g., that the setting information has been stored in the electric device), and, in response to a reading signal (e.g., requesting setting information stored in the electric device), the IC chip 82 generates a high-frequency response signal containing an indication of the read out information, which, in this case, is device ID and the setting information. Then, the IC chip 82 superimposes the generated high-frequency response signal to the electric-power supply line that is connected to the power plug 31 through the high-pass filter 83. The response signal is transmitted, e.g., via load modulation, from the power plug 31 to the server 11 via the outlet 61 of the power strip 13 and the electric-power supply line 14.

In Step 44, the reader/writer 42 of the server 11 receives the response signal from the electric-power supply line 14 via the high-pass filter 43.

In Step S45, the reader/writer 42 supplies the received response signal to the control unit 41. In this way, the control unit 41 receives the response signal from the electric device 12. That is, when the power plug 31 of the electric device 12 is connected to the outlet 61 of the power strip 13, the control unit 41 receives the device ID and the setting information of the electric device 12 as a response signal. In contrast, when the power plug 31 of the electric device 12 is not connected to the outlet 61 of the power strip 13, the reader/writer 42 of the server 11 receives a response signal containing no information because the high-frequency signal generated by the IC chip 82 is not superimposed to the electric-power supply line 14. Thus, in such a case, the control unit 41 receives an empty signal and does not receive the setting information.

Since the IC chip 82 operates on electric power acquired though load modulation, the IC chip 82 can be operated any time when necessary, even when the electric device 12 is not operating. Hence, for example, when the electric device 12, which is a portable terminal or a portable personal computer, is not operating or is not operating because the battery level is zero, communication between the server 11 and the IC chip 82 can still be established. In the following, operation associated with the communication process will not be repeated.

Referring back to the flowchart in FIG. 2, the following steps in the process will be described.

In Step S2, the control unit 41 determines whether the device ID and the setting information were acquired from the reader/writer 42. As described above, if the power plug 31 of the electric device 12 is not connected to the outlet 61 of the power strip 13, the device ID and the setting information are not read out. Thus, in Step S2, the process returns to Step S1 if the power plug 31 of the electric device 12 is not connected to the outlet 61 of the power strip 13. That is, Steps S1 and S2 are repeated until the power plug 31 of the electric device 12 is connected to the outlet 61 of the power strip 13. These steps are carried out to check whether the power plug 31 of the electric device 12 is connected to the outlet 61 of the power strip 13. Thus, the steps may be carried out at certain time intervals, as in polling.

In Step S2, if the power plug 31 of the electric device 12 is connected to the outlet 61 of the power strip 13 and the device ID and the setting information are read out, the process proceeds to Step S3.

In Step S3, the control unit 41 controls the determining unit 41a to determine whether the readout setting information is for establishing communication with the wireless communication unit 44. That is, if the wireless communication unit 44 performs wireless LAN communication, it is determined whether the setting information, such as an IP address, a default gateway, a WEP key, an SSID, and a user ID, matches the information for establishing communication with the wireless communication unit 44. If the wireless communication unit 44 performs Bluetooth communication, it is determined whether the setting information, such as an SSID and a passcode, matches the information for establishing Bluetooth communication with the wireless communication unit 44.

In Step S3, if, for example, the setting information acquired is not information for communication with the wireless communication unit 44 and thus the electric device 12 and the server 11 are unable to establish wireless communication, the process proceeds to Step S4.

In Step S4, the control unit 41 controls the reader/writer 42 to write the setting information for establishing wireless communication between a wireless connection unit 86 of the electric device 12 and the wireless communication unit 44 of the server 11 to the IC chip 82 of the electric device 12, which is connected to the outlet 61 via the power plug 31.

If, for example, the setting information acquired in Step S3 is setting information for establishing communication with the wireless communication unit 44, Step S4 is skipped because the electric device 12 and the server 11 are already capable of carrying out wireless communication.

Through the process described above, setting information on various settings for establishing communication between the wireless connection unit 86 of the electric device 12 and the wireless communication unit 44 of the server 11 is recorded on the IC chip 82 of the electric device 12 when a customer of a restaurant connects the power plug 31 of the electric device 12, which is a portable terminal or a portable personal computer belonging to the customer, to the outlet 61 of the power strip 13, which is installed in the restaurant. Accordingly, a control unit 81 of the electric device 12 reads out the setting information stored on the IC chip 82 and controls the wireless connection unit 86 on the basis of the readout setting information to establish communication with the wireless communication unit 44 of the server 11, which is installed in the restaurant.

As a result, the customer can use a network service, such as an Internet service, by establishing wireless communication between the electric device 12 and the server 11 by merely connecting the power plug 31 to the outlet 61 of the power strip 13, which is installed in the restaurant.

Such a wireless communication service is provided to only the customers of the restaurant. In other words, the wireless communication service is only provided to customers of the restaurant. For this reason, whether the electric device 12 belongs to a customer should be determined. Since the power strip 13 is installed inside the restaurant, the electric device 12 from which setting information can be read out in Step S2 in the flowchart in FIG. 2 is presumed to belong to a customer of the restaurant. Thus, when the setting information can be read out in Step S2, it is practical to determine that the electric device 12 from which the setting information is read out belongs to a customer. If the electric device 12, which includes the IC chip 82 to which the setting information is registered, has a power source, such as a battery, the electric device 12 can continue to use the wireless communication service even after removing the power plug 31 from the outlet 61.

Second Embodiment

Electric-Power Supplying System that Processes Billing Associated with Wireless Communication A wireless-LAN use management process associated with the wireless communication service provided free of charge to customers of a restaurant has been described above. When a fee is charged for a service associated with wireless communication, the wireless communication service may be provided by writing the setting information to the IC chip 82 when it is confirmed that the electric device belongs to a customer and the billing of the service fee has been processed.

Figure 4:
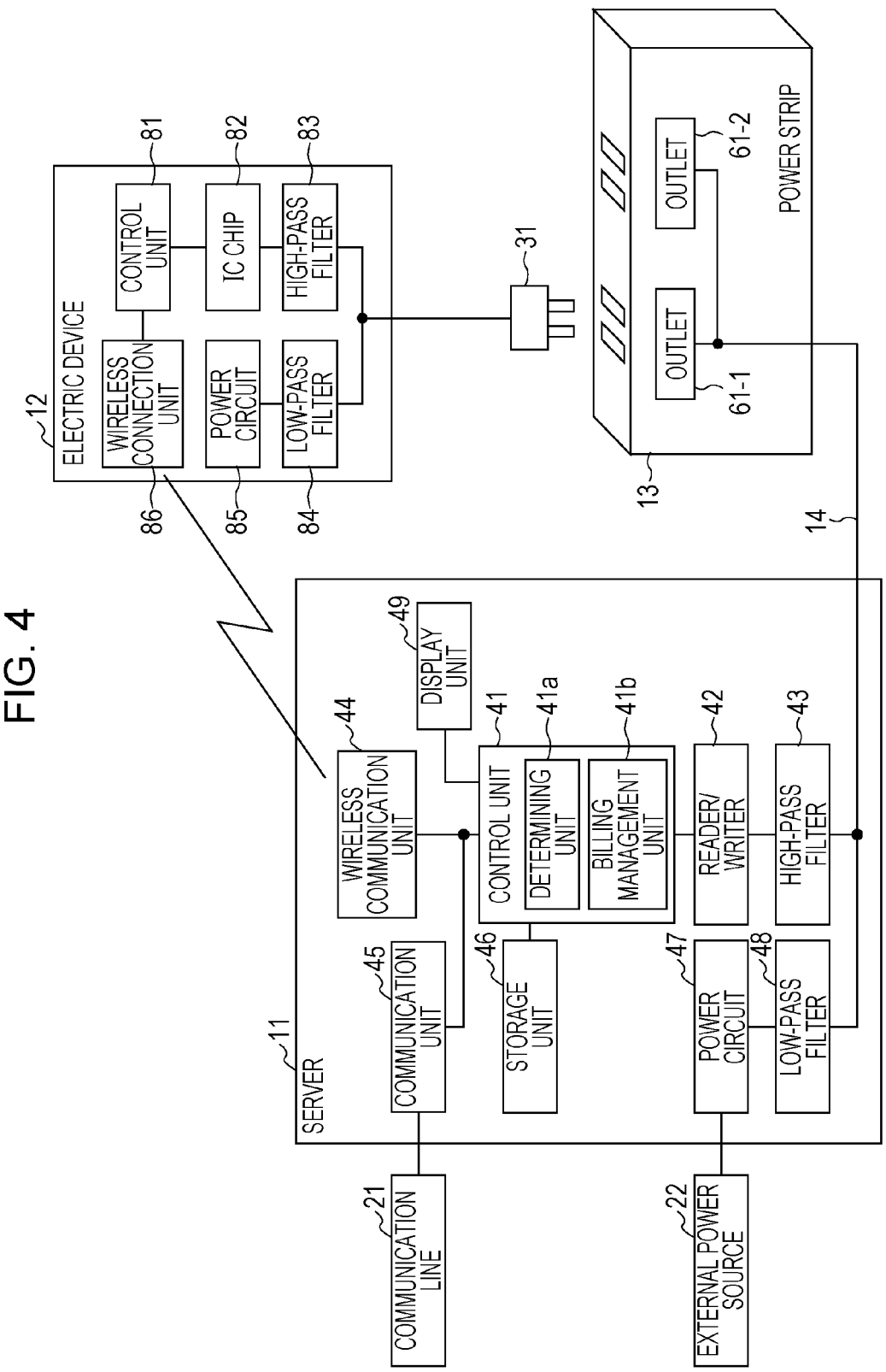
FIG. 4 is a block diagram of an example configuration of an electric-power supplying system according to a second embodiment of the present technology.

FIG. 4 illustrates an electric-power supplying system that provides a wireless communication service only when the billing is processed to the electric device 12, which is a portable terminal or a portable personal computer that belongs to a customer of a restaurant. Components having the same functions as the components of the electric-power supplying system in FIG. 1 are represented by the same names and reference numerals, and descriptions thereof are omitted when appropriate.

The electric-power supplying system in FIG. 4 differs from the electric-power supplying system in FIG. 1 in that a billing management unit 41b is included in the control unit 41 of the server 11. The billing management unit 41b controls the external communication line 21 to authenticate the billing information, such as an account number or a credit card number, by accessing a server (not shown) of, for example, a financial institution based on the billing information used for processing the billing. The billing management unit 41b manages the billing process on the basis of the authenticity of the billing information confirmed through such authentication process. Upon confirming that the electric device 12 belongs to a customer and billing of the service fee is possible, the control unit 41 controls the reader/writer 42 to write the setting information for establishing wireless communication in the IC chip 82 of the electric device 12.

For the electric-power supplying system in FIG. 4, when using the wireless communication service for the first time by accessing the server 11 with the electric device 12, which belongs to a customer of the restaurant, the user of the service, who is the customer in this case or a worker at the restaurant, inputs to the server 11 the billing information, such as an account number or a credit card number to be used for processing the billing. Only when the input account number or credit card number is authenticated, the control unit 41 of the server 11 registers the setting information for establishing wireless communication to the IC chip 82. Thus, in the electric-power supplying system illustrated in FIG. 4, the server 11 carries out a series of processing for registering the setting information, including the authentication process of the billing information, with the power plug 31 of the electric device 12 being connected to the outlet 61 of the power strip 13, which is, for example, disposed near the server 11.

Wireless-LAN Use Management Process Carried Out in Electric-Power Supplying System in FIG. 4

Figure 5:
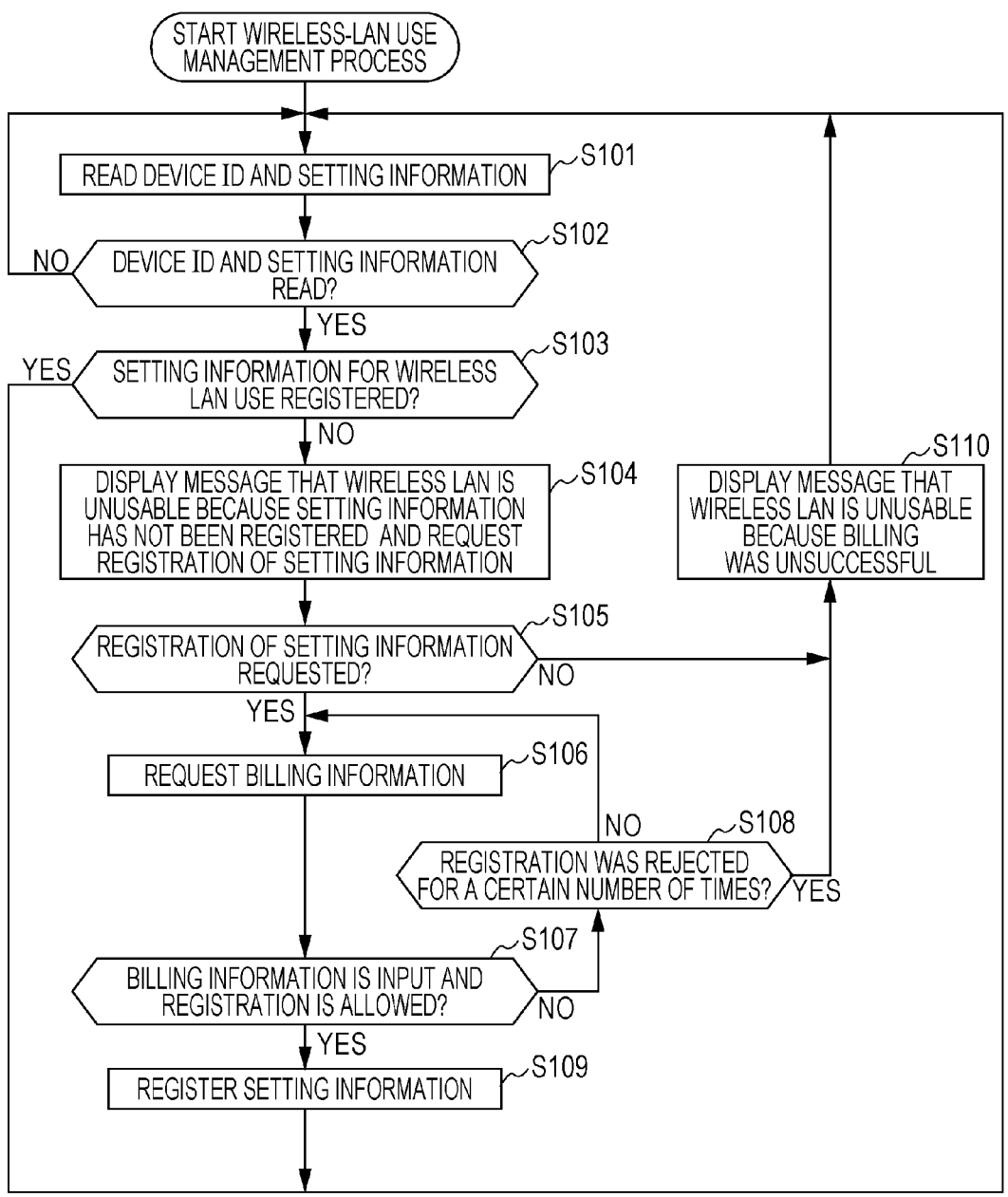
FIG. 5 is a flowchart illustrating a wireless-LAN use management process carried out by the electric-power supplying system in FIG. 4.

The wireless-LAN use management process carried out by the electric-power supplying system in FIG. 4 will be described below with reference to the flowchart in FIG. 5. Steps S101, S102, and S109 in the flowchart in FIG. 5 are the same as Steps, S1, S2, and S4, respectively, in the flowchart of FIG. 2, and thus, descriptions will be omitted.

When, for example, a customer or worker of the restaurant connects the power plug 31 of the electric device 12 to the outlet 61 of the power strip 13, which is disposed near the server 11, so as to register the setting information for establishing wireless communication, the device ID and the setting information is read out in Steps S101 and S102. In Step S103, the control unit 41 of the server 11 controls the determining unit 41a to determine whether the readout setting information is the setting information for establishing communication with the wireless communication unit 44.

In Step S103, if, for example, the setting information read out by the electric device 12 was not the appropriate setting information for establishing communication with the wireless communication unit 44 and therefore wireless communication is not established between the electric device 12 and the server 11, the process proceeds to Step S104.

In Step S104, the control unit 41 controls a display unit 39 to display a notice indicating that wireless communication service is not provided because the setting information for establishing wireless communication is not registered in the electric device 12 from which the device ID was read out by the reader/writer 42 and displays an image advising registration of the appropriate setting information.

In Step S105, the control unit 41 determines whether the display unit 49, which has a touch panel has been operated and registration of the setting information for establishing wireless communication has been requested. In Step S105, if, for example, the display unit 49 has been operated and registration of the setting information has been requested, the process proceeds to Step S106.

In Step S106, the control unit 41 controls the billing management unit 41b to carry out registration of the billing information. In this way, the billing management unit 41b controls the display unit 49, including the touch panel, to display an image requesting the input of billing information of the owner of the electric device 12 from which the device ID is currently being read out.

In Step S107, the billing management unit 41b determines whether the billing information has been input by operating the display unit 49, including a touch panel, whether the input billing information is authenticated, and whether the setting information of the electric device 12 can be registered. Specifically, upon input of the billing information by operating the display unit 49, the billing management unit 41b controls the communication unit 45 to access a server of a financial institution (not shown) via the external communication line 21, send a query concerning the authenticity of the billing information and determine the authenticity of the billing information. In Step S107, if, for example, the billing information is not authenticated, registration of the setting information to the IC chip 82 of the electric device 12 corresponding to the device ID is rejected, and the process proceeds to Step S108.

In Step S108, the billing management unit 41b determines whether the number of times registration of the setting information was rejected due to unauthenticated billing information is within a certain number. When the number of times is within the certain number, the process returns to Step S106. That is, if the input billing information has not been authenticated and registration of the setting information is rejected for a number of times within a certain number, Steps S106 through S108 are repeated. Then, in Step S107, if it is determined that the billing information has been authenticated and registration of the setting information is allowed, the process proceeds to Step S109 to register the setting information. That is, once the billing information is authenticated, it is presumed that the billing associated with the wireless communication has been processed, and the setting information that is used for the wireless communication is registered. Thus, after this process, the user can use the wireless communication service with the server 11 even with the power plug 31 of the electric device 12 removed from the outlet 61, which is disposed near the server 11, and even after moving to another seat and using the electric device 12 without connecting the power plug 31 to the outlet 61, i.e., using the electric device 12 on battery.

In Step S108, if it is determined that the number of times registration of the setting information was rejected due to unauthenticated billing information is more than a certain number, in Step S110, the billing management unit 41b controls the display unit 49 to display information indicating that the wireless communication service is not provided because the billing was not processed due to unauthenticated billing information. Then, the process returns to Step S101.

In Step S103, if the acquired setting information of the electric device 12 is the setting information for establishing communication with the wireless communication unit 44 and the setting information has already been registered, the process ends and then starts again from Step S101. Since the setting information has already been registered, the wireless connection unit 86 of the electric device 12 can establish wireless communication with the wireless communication unit 44 of the server 11. In Step S103, if it is determined that the setting information has already been registered, a notification indicating that the setting information has already been registered may be displayed on the display unit 49. By displaying a notification indicating that the setting information has already been registered, the user or worker of the restaurant can confirm that the electric device 12 is ready to use the wireless communication service. In other words, the user or worker of the restaurant can confirm that the wireless communication service is available even after the power plug 31 is removed from the outlet 61 of the power strip 13, which is disposed near the server 11.

Through the process described above, the wireless communication service that allows the electric device 12 owned by a user to access the server 11 by wireless communication is available only to the user who is a customer of the restaurant and has paid the wireless communication service fee through a billing process.

In the above, an example has been described in which the setting information for the wireless communication service is registered to the IC chip 82 of the electric device 12 only when a user is a customer of a restaurant and has paid a service fee. Instead, the setting information for using the wireless communication service may be registered if, for example, electronic money can be charged to the IC chip 82, and the service fee can be paid with the charged electronic money. In such a case, if the payment of the wireless communication service fee is not processed using electronic money, the setting information for wireless communication, which is registered in the IC chip 82, may be deleted to make the wireless communication service unavailable.

In the above, an example of a billing process for a wireless communication service has been described. In addition, the charge for electricity supplied to the electric device 12 may be paid through the billing process.

As described above, according to the present technology, a communication service that is to be provided only to users who has been registered to use the network can be easily provided by omitting the operation of input of setting information for establishing communication.

The series of processing described above may be carried out by hardware or software. When the series of processing is to be carried out by software, the program constituting the software is installed to a computer. The computer includes a computer installed in special hardware or, for example, a general-purpose personal computer that is capable of performing various functions according to various installed programs.

Figure 6:
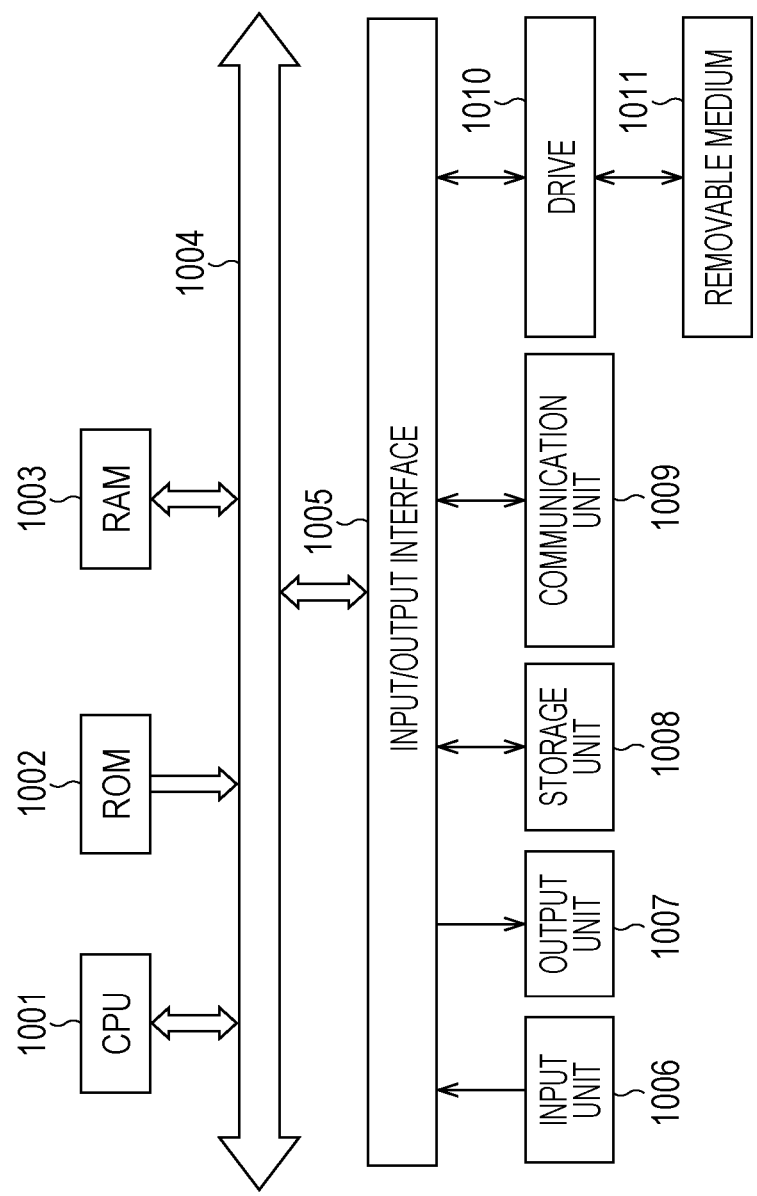
FIG. 6 illustrates an example configuration of a general-purpose personal computer.

FIG. 6 is block diagram of an example configuration of hardware of a computer that executes a program that carries out the series of processing described above.

In a computer, a central processing unit (CPU) 1001, a read only memory (ROM) 1002, and a random access memory (RAM) 1003 are connected with each other via a bus 1004.

The bus 1004 is connected to an input/output interface 1005. The input/output interface 1005 is connected to an input unit 1006, an output unit 1007, a storage unit 1008, a communication unit 1009, and a drive 1010.

The input unit 1006 includes a keyboard, a mouse, and a microphone. The output unit 1007 includes a display and a speaker. The storage unit 1008 includes a hard disc and/or a non-volatile memory. The communication unit 1009 includes a network interface. The drive 1010 drives a removable medium 1011, such as a magnetic disc, an optical disc, a magnetooptical disc, or a semiconductor memory.

In a computer having the above-described configuration, the CPU 1001 loads, for example, a program stored in the storage unit 1008 to the RAM 1003 via the input/output interface 1005 and the bus 1004 and executes the loaded program to carry out the series of processing described above.

The program executed by the computer (CPU 1001) is, for example, provided as a program stored on the removable medium 1011, which is a package medium. The program may be provided via a wired or wireless transmitting medium, such as a local area network, the Internet, or digital satellite broadcasting.

In the computer, the programs can be installed in the storage unit 1008 via the input/output interface 1005 by loading the removable medium 1011 to the drive 1010. The program may be installed in the storage unit 1008 by transmitting the program to the communication unit 1009 via the wired or wireless transmitting medium. The program may be installed in advance in the ROM 1002 and/or the storage unit 1008.

The processing steps in the program executed by the computer may be carried out in a time-sequential order following the descriptions above, may be carried out in parallel, or may be carried out individually at appropriate timings when the program is called.

In this specification, a system is a collection of a plurality of components, devices, modules or parts, etc. and all components are not necessarily disposed in a single casing. Thus, a system may include a plurality of devices disposed in individual casings and connected via a network or may be a device including a plurality of modules disposed in a single casing.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of embodiments of the present invention comprises at least one computer-readable storage medium (i.e., a tangible, non-transitory computer-readable medium, such as a computer memory, a floppy disk, a compact disk, a magnetic tape, or other tangible, non-transitory computer-readable medium) encoded with a computer program (i.e., a plurality of instructions), which, when executed on one or more processors, performs above-discussed functions of embodiments of the present invention. The computer-readable storage medium can be transportable such that the program stored thereon can be loaded onto any computer resource to implement aspects of the present invention discussed herein. In addition, it should be appreciated that the reference to a computer program which, when executed, performs any of the above-discussed functions, is not limited to an application program running on a host computer. Rather, the term "computer program" is used herein in a generic sense to reference any type of computer code (e.g., software or microcode) that can be employed to program one or more processors to implement above-discussed aspects of the present invention.

The embodiments of the present technology are not limited to the embodiments described above, and various modifications are possible without departing from the scope of the technology.

For example, the present technology may be formed of cloud computing in which a single function is shared among devices connected via a network.

The steps in the flowcharts described above may be carried out by a single device or may be carried out by a plurality of devices sharing the task.

When a multiple procedures are included in a single step, the procedures included in the step may be carried out by a single device or may be carried out by a plurality of devices sharing the task.

The present technology may provide any of the following configurations:

1. Apparatus comprising a power supply configured to supply electric power to an electric device via a power supply line, and at least one processor programmed to perform acts comprising: transmitting a command signal to the electric device via the power supply line; receiving a response signal from the electric device via load modulation on the power supply line; and registering setting information for establishing wireless communication between the electric device and the apparatus based on the received response signal.

2. The apparatus of configuration 1, wherein the at least one processor is programmed to transmit the command signal via load modulation on the power supply line.

3. The apparatus of configuration 1, wherein the command signal is configured to instruct the electric device to read and/or write the setting information for registering the electric device for wireless communication.

4. The apparatus of configuration 3, wherein the setting information comprises at least one item selected from the group consisting of: an SSID, a WEP key, a passcode, a user ID, an IP address, and a default gateway.

5. The apparatus of configuration 3, wherein the command signal comprises a request for the setting information, and wherein the response signal comprises an indication of the requested setting information.

6. The apparatus of configuration 5, wherein the at least one processor is further programmed to determine whether the setting information indicated by the response signal is valid for wireless communication with the apparatus.

7. The apparatus of configuration 6, wherein the at least one processor is further programmed to, in response to determining that the setting information indicated by the response signal is not valid for wireless communication with the apparatus, transmit a signal to the electric device to store different setting information that is valid for wireless communication with the apparatus.

8. The apparatus of configuration 3, wherein the command signal comprises an indication of the setting information, and wherein the response signal comprises a confirmation that the setting information has been stored in the electric device.

9. The apparatus of configuration 1, wherein the at least one processor is further programmed to perform acts comprising: receiving billing information from a user of the electric device; and requesting authentication of the received billing information; wherein the at least one processor is programmed to register the electric device for wireless communication only if the billing information is authenticated.

10. Apparatus comprising: means for supplying electric power to an electric device via a power supply line; means for transmitting a command signal to the electric device via the power supply line; means for receiving a response signal from the electric device via load modulation on the power supply line; and means for registering setting information for establishing wireless communication between the electric device and the apparatus based on the received response signal.

11. The apparatus of configuration 10, wherein the means for transmitting the command signal is configured to transmit the command signal via load modulation on the power supply line.

12. The apparatus of configuration 10, wherein the command signal is configured to instruct the electric device to read and/or write the setting information for registering the electric device for wireless communication.

13. The apparatus of configuration 12, wherein the setting information comprises at least one item selected from the group consisting of: an SSID, a WEP key, a passcode, a user ID, an IP address, and a default gateway.

14. The apparatus of configuration 12, wherein the command signal comprises a request for the setting information, and wherein the response signal comprises an indication of the requested setting information.

15. The apparatus of configuration 14, further comprising means for determining whether the setting information indicated by the response signal is valid for wireless communication with the apparatus.

16. The apparatus of configuration 15, further comprising means for transmitting to the electric device, in response a determination that the setting information indicated by the response signal is not valid for wireless communication with the apparatus, a signal to store different setting information that is valid for wireless communication with the apparatus.

17. The apparatus of configuration 12, wherein the command signal comprises an indication of the setting information, and wherein the response signal comprises a confirmation that the setting information has been stored in the electric device.

18. The apparatus of configuration 10, further comprising: means for receiving billing information from a user of the electric device; and means for requesting authentication of the received billing information; wherein the means for registering the electric device for wireless communication is configured to register the electric device only if the billing information is authenticated.

19. Apparatus comprising: a power plug configured to receive electric power and a command signal from an external device; and an IC chip configured to use load modulation to transmit a response signal, in response to the command signal, to the external device via the power plug.

20. The apparatus of configuration 19, wherein the command signal is configured to instruct the IC chip to read and/or write setting information for registering the apparatus for wireless communication.

21. The apparatus of configuration 20, wherein the setting information comprises at least one item selected from the group consisting of: an SSID, a WEP key, a passcode, a user ID, an IP address, and a default gateway.

22. The apparatus of configuration 20, wherein the command signal comprises a request for the setting information, and wherein the response signal comprises an indication of the requested setting information.

23. The apparatus of configuration 20, wherein the command signal comprises an indication of the setting information, and wherein the response signal comprises a confirmation that the setting information has been stored in the IC chip.

24. The apparatus of configuration 19, further comprising a filter configured to block a frequency of the electric power from the power plug and to pass a frequency of the command signal to the IC chip.

25. Apparatus comprising: means for receiving electric power and a command signal from an external device; and means for transmitting a response signal to the external device, in response to the command signal, using load modulation via the power plug.

26. The apparatus of configuration 25, wherein the command signal is configured to instruct the apparatus to read and/or write setting information for registering the apparatus for wireless communication.

27. The apparatus of configuration 26, wherein the setting information comprises at least one item selected from the group consisting of: an SSID, a WEP key, a passcode, a user ID, an IP address, and a default gateway.

28. The apparatus of configuration 26, wherein the command signal comprises a request for the setting information, and wherein the response signal comprises an indication of the requested setting information.

29. The apparatus of configuration 26, wherein the command signal comprises an indication of the setting information, and wherein the response signal comprises a confirmation that the setting information has been stored in the apparatus.

30. The apparatus of configuration 25, further comprising means for blocking a frequency of the electric power from the power plug and passing a frequency of the command signal.

31. A system comprising an electric device, and a server apparatus comprising a power supply configured to supply electric power to the electric device via a power supply line; and at least one processor programmed to perform acts comprising: transmitting a command signal to the electric device via the power supply line; receiving a response signal from the electric device via load modulation on the power supply line; and registering setting information for establishing wireless communication between the electric device and the server apparatus based on the received response signal; wherein the electric device comprises an IC chip configured to use load modulation to transmit the response signal, in response to the command signal, to the server apparatus via the power supply line.

32. The system of configuration 31, wherein the at least one processor is programmed to transmit the command signal via load modulation on the power supply line.

33. The system of configuration 31, wherein the command signal is configured to instruct the IC chip to read and/or write the setting information for registering the electric device for wireless communication.

34. The system of configuration 33, wherein the setting information comprises at least one item selected from the group consisting of: an SSID, a WEP key, a passcode, a user ID, an IP address, and a default gateway.

35. The system of configuration 33, wherein the command signal comprises a request for the setting information, and wherein the response signal comprises an indication of the requested setting information.

36. The system of configuration 35, wherein the at least one processor is further programmed to determine whether the setting information indicated by the response signal is valid for wireless communication with the apparatus.

37. The system of configuration 36, wherein the at least one processor is further programmed to, in response to determining that the setting information indicated by the response signal is not valid for wireless communication with the apparatus, transmit a signal to the IC chip to store different setting information that is valid for wireless communication with the apparatus.

38. The system of configuration 33, wherein the command signal comprises an indication of the setting information, and wherein the response signal comprises a confirmation that the setting information has been stored in the IC chip.

39. The system of configuration 31, wherein the at least one processor is further programmed to perform acts comprising: receiving billing information from a user of the electric device; and requesting authentication of the received billing information; wherein the at least one processor is programmed to register the electric device for wireless communication only if the billing information is authenticated.

40. The system of configuration 31, wherein the electric device further comprises a filter configured to block a frequency of the electric power from the power supply line and to pass a frequency of the command signal to the IC chip.

41. A system comprising an electric device, and a server apparatus comprising: means for supplying electric power to an electric device via a power supply line; means for transmitting a command signal to the electric device via the power supply line; means for receiving a response signal from the electric device via load modulation on the power supply line; and means for registering setting information for establishing wireless communication between the electric device and the server apparatus based on the received response signal; wherein the electric device comprises means for transmitting the response signal to the server apparatus, in response to the command signal, via load modulation on the power supply line.

42. The system of configuration 41, wherein the means for transmitting the command signal is configured to transmit the command signal via load modulation on the power supply line.

43. The system of configuration 41, wherein the command signal is configured to instruct the electric device to read and/or write the setting information for registering the electric device for wireless communication.

44. The system of configuration 43, wherein the setting information comprises at least one item selected from the group consisting of: an SSID, a WEP key, a passcode, a user ID, an IP address, and a default gateway.

45. The system of configuration 43, wherein the command signal comprises a request for the setting information, and wherein the response signal comprises an indication of the requested setting information.

46. The system of configuration 45, wherein the server apparatus further comprises means for determining whether the setting information indicated by the response signal is valid for wireless communication with the server apparatus.

47. The system of configuration 46, wherein the server apparatus further comprises means for transmitting to the electric device, in response a determination that the setting information indicated by the response signal is not valid for wireless communication with the server apparatus, a signal to store different setting information that is valid for wireless communication with the server apparatus.

48. The system of configuration 43, wherein the command signal comprises an indication of the setting information, and wherein the response signal comprises a confirmation that the setting information has been stored in the electric device.

49. The system of configuration 41, wherein the server apparatus further comprises: means for receiving billing information from a user of the electric device; and means for requesting authentication of the received billing information; wherein the means for registering the electric device for wireless communication is configured to register the electric device only if the billing information is authenticated.

50. The system of configuration 41, wherein the electric device further comprises means for blocking a frequency of the electric power from the power supply line and passing a frequency of the command signal.

51. A method comprising: supplying electric power to an electric device via a power supply line; transmitting a command signal to the electric device via the power supply line; receiving a response signal from the electric device via load modulation on the power supply line; and registering setting information for establishing wireless communication with the electric device based on the received response signal.

52. The method of configuration 51, wherein the transmitting comprises transmitting the command signal via load modulation on the power supply line.

53. The method of configuration 51, wherein the command signal is configured to instruct the electric device to read and/or write the setting information for registering the electric device for wireless communication.

54. The method of configuration 53, wherein the setting information comprises at least one item selected from the group consisting of: an SSID, a WEP key, a passcode, a user ID, an IP address, and a default gateway.

55. The method of configuration 53, wherein the command signal comprises a request for the setting information, and wherein the response signal comprises an indication of the requested setting information.

56. The method of configuration 55, further comprising determining whether the setting information indicated by the response signal is valid for wireless communication.

57. The method of configuration 56, further comprising, in response to determining that the setting information indicated by the response signal is not valid for wireless communication, transmitting a signal to the electric device to store different setting information that is valid for wireless communication.

58. The method of configuration 53, wherein the command signal comprises an indication of the setting information, and wherein the response signal comprises a confirmation that the setting information has been stored in the electric device.

59. The method of configuration 51, further comprising: receiving billing information from a user of the electric device; and requesting authentication of the received billing information; wherein the registering is performed only if the billing information is authenticated.

60. A method comprising: receiving electric power and a command signal from an external device via a power plug; and using load modulation to transmit a response signal, in response to the command signal, to the external device via the power plug.

61. The method of configuration 60, further comprising, in response to the command signal, reading and/or writing setting information for registering an apparatus for wireless communication.

62. The method of configuration 61, wherein the setting information comprises at least one item selected from the group consisting of: an SSID, a WEP key, a passcode, a user ID, an IP address, and a default gateway.

63. The method of configuration 61, wherein the command signal comprises a request for the setting information, and wherein the response signal comprises an indication of the requested setting information.

64. The method of configuration 61, wherein the command signal comprises an indication of the setting information, and wherein the response signal comprises a confirmation that the setting information has been stored in the apparatus.

65. The method of configuration 60, further comprising blocking a frequency of the electric power from the power plug and passing a frequency of the command signal.

66. At least one computer-readable storage medium encoded with computer-executable instructions that, when executed, perform a method comprising: supplying electric power to an electric device via a power supply line; transmitting a command signal to the electric device via the power supply line; receiving a response signal from the electric device via load modulation on the power supply line; and registering setting information for establishing wireless communication with the electric device based on the received response signal.

67. The at least one computer-readable storage medium of configuration 66, wherein the transmitting comprises transmitting the command signal via load modulation on the power supply line.

68. The at least one computer-readable storage medium of configuration 66, wherein the command signal is configured to instruct the electric device to read and/or write the setting information for registering the electric device for wireless communication.

69. The at least one computer-readable storage medium of configuration 68, wherein the setting information comprises at least one item selected from the group consisting of: an SSID, a WEP key, a passcode, a user ID, an IP address, and a default gateway.

70. The at least one computer-readable storage medium of configuration 68, wherein the command signal comprises a request for the setting information, and wherein the response signal comprises an indication of the requested setting information.

71. The at least one computer-readable storage medium of configuration 70, wherein the method further comprises determining whether the setting information indicated by the response signal is valid for wireless communication.

72. The at least one computer-readable storage medium of configuration 71, wherein the method further comprises, in response to determining that the setting information indicated by the response signal is not valid for wireless communication, transmitting a signal to the electric device to store different setting information that is valid for wireless communication.

73. The at least one computer-readable storage medium of configuration 68, wherein the command signal comprises an indication of the setting information, and wherein the response signal comprises a confirmation that the setting information has been stored in the electric device.

74. The at least one computer-readable storage medium of configuration 66, wherein the method further comprises: receiving billing information from a user of the electric device; and requesting authentication of the received billing information; wherein the registering is performed only if the billing information is authenticated.

75. At least one computer-readable storage medium encoded with computer-executable instructions that, when executed, perform a method comprising: receiving electric power and a command signal from an external device via a power plug; and using load modulation to transmit a response signal, in response to the command signal, to the external device via the power plug.

76. The at least one computer-readable storage medium of configuration 75, wherein the method further comprises, in response to the command signal, reading and/or writing setting information for registering an apparatus for wireless communication.

77. The at least one computer-readable storage medium of configuration 76, wherein the setting information comprises at least one item selected from the group consisting of: an SSID, a WEP key, a passcode, a user ID, an IP address, and a default gateway.

78. The at least one computer-readable storage medium of configuration 76, wherein the command signal comprises a request for the setting information, and wherein the response signal comprises an indication of the requested setting information.

79. The at least one computer-readable storage medium of configuration 76, wherein the command signal comprises an indication of the setting information, and wherein the response signal comprises a confirmation that the setting information has been stored in the apparatus.

80. The at least one computer-readable storage medium of configuration 75, wherein the method further comprises blocking a frequency of the electric power from the power plug and passing a frequency of the command signal.

The present disclosure contains subject matter related to that disclosed in Japanese Priority Patent Application JP 2011-199420 filed in the Japan Patent Office on Sep. 13, 2011, the entire contents of which are hereby incorporated by reference.

The phraseology and terminology used herein is for the purpose of description and should not be regarded as limiting. The use of "including," "comprising," "having," "containing", "involving", and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements from each other.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus comprising:
  a power supply configured to supply electric power to an electric device via an outlet of the power supply, wherein the electric device is plugged into the outlet; and
  at least one processor configured to:
    transmit a command signal to the electric device via load modulation on a power supply line connected between the power supply and the outlet;
    receive a response signal from the electric device via load modulation on the power supply line; and
    register setting information in the electric device for establishing wireless communication between the electric device and the apparatus based on the received response signal,
  wherein the electric device, in a non-operational state, communicates with the apparatus based on electric power acquired by the electric device through the load modulation, and
  wherein, the command signal comprises a signal for generating driving power for the apparatus a certain period of time at the head of the command signal.

2. The apparatus of claim 1, wherein the command signal is configured to instruct the electric device to read and/or write the setting information for registering the electric device for wireless communication.

3. The apparatus of claim 2, wherein the setting information comprises at least one of: a service set identifier (SSID), a wired equivalent privacy (WEP) key, a passcode, a user ID, an internet protocol (IP) address, and a default gateway.

4. The apparatus of claim 2, wherein the command signal comprises a request for the setting information, and wherein the response signal comprises an indication of the requested setting information.

5. The apparatus of claim 4, wherein the at least one processor is further configured to determine whether the setting information indicated by the response signal is valid for wireless communication with the apparatus.

6. The apparatus of claim 5, wherein the at least one processor is further configured to, in response to determining that the setting information indicated by the response signal is not valid for wireless communication with the apparatus, transmit a signal to the electric device via the outlet to store different setting information in the electric device and wherein the different setting information is valid for wireless communication with the apparatus.

7. The apparatus of claim 1, wherein the command signal comprises an indication of the setting information, and wherein the response signal comprises a confirmation that the setting information has been stored in the electric device.

8. The apparatus of claim 1, wherein the at least one processor is further configured to:
  receive billing information from a user of the electric device;
  request authentication of the received billing information; and
  register the electric device for wireless communication when the received billing information is authenticated.

9. The apparatus of claim 1, wherein the power supply is configured to supply alternating current (AC) electric power to the electric device via the outlet.

10. The apparatus of claim 1, wherein the power supply line is connected between the apparatus and the electric device.

11. An apparatus comprising:
  a power plug configured to receive a command signal from an external device, wherein the power plug is plugged into an outlet of the external device; and
  an integrated circuit (IC) chip configured to transmit a response signal, in response to the received command signal, to the external device via the power plug,
  wherein the response signal is transmitted to the external device via load modulation on a power supply line connected between the outlet and a power supply of the external device, and register setting information in the apparatus for establishing wireless communication between the external device and the apparatus based on the received response signal,
  wherein the apparatus, in a non-operational state, communicates with the external device based on electric power acquired by the apparatus through the load modulation, and
  wherein the command signal comprises a signal for generating driving power for the apparatus a certain period of time at the head of the command signal.

12. The apparatus of claim 11, wherein the command signal is configured to instruct the IC chip to read and/or write setting information for registering the apparatus for wireless communication.

13. The apparatus of claim 12, wherein the setting information comprises at least one of: a service set identifier (SSID), a wired equivalent privacy (WEP) key, a passcode, a user ID, an internet protocol (IP) address, and a default gateway.

14. The apparatus of claim 12, wherein the command signal comprises a request for the setting information, and wherein the response signal comprises an indication of the requested setting information.

15. The apparatus of claim 12, wherein the command signal comprises an indication of the setting information, and wherein the response signal comprises a confirmation that the setting information has been stored in the IC chip.

16. The apparatus of claim 11, further comprising a filter configured to block a frequency of the received electric power from the power plug and to pass a frequency of the command signal to the IC chip.

17. The apparatus of claim 11,
wherein the IC chip operates on the received electric power, and
wherein the electric power and the command signal are received from the external device via load modulation on the power supply line.

18. A method comprising:
in an apparatus:
supplying electric power to an electric device via an outlet of the apparatus, wherein the electric device is plugged into the outlet;
transmitting a command signal to the electric device via load modulation on a power supply line connected between a power supply of the apparatus and the outlet;
receiving a response signal from the electric device via load modulation on the power supply line; and
registering setting information in the electric device for establishing wireless communication with the electric device based on the received response signal,
wherein the electric device, in a non-operational state, communicates with the apparatus based on electric power acquired by the electric device through the load modulation, and
wherein the command signal comprises a signal for generating driving power for the apparatus a certain period of time at the head of the command signal.

19. The method of claim 18, wherein the command signal is configured to instruct the electric device to read and/or write the setting information for registering the electric device for wireless communication.

20. The method of claim 19, wherein the command signal comprises a request for the setting information, and wherein the response signal comprises an indication of the requested setting information.

21. The method of claim 18, further comprising:
receiving billing information from a user of the electric device;
requesting authentication of the received billing information; and
registering the electric device for wireless communication when the received billing information is authenticated.

* * * * *